Patented Sept. 16, 1930

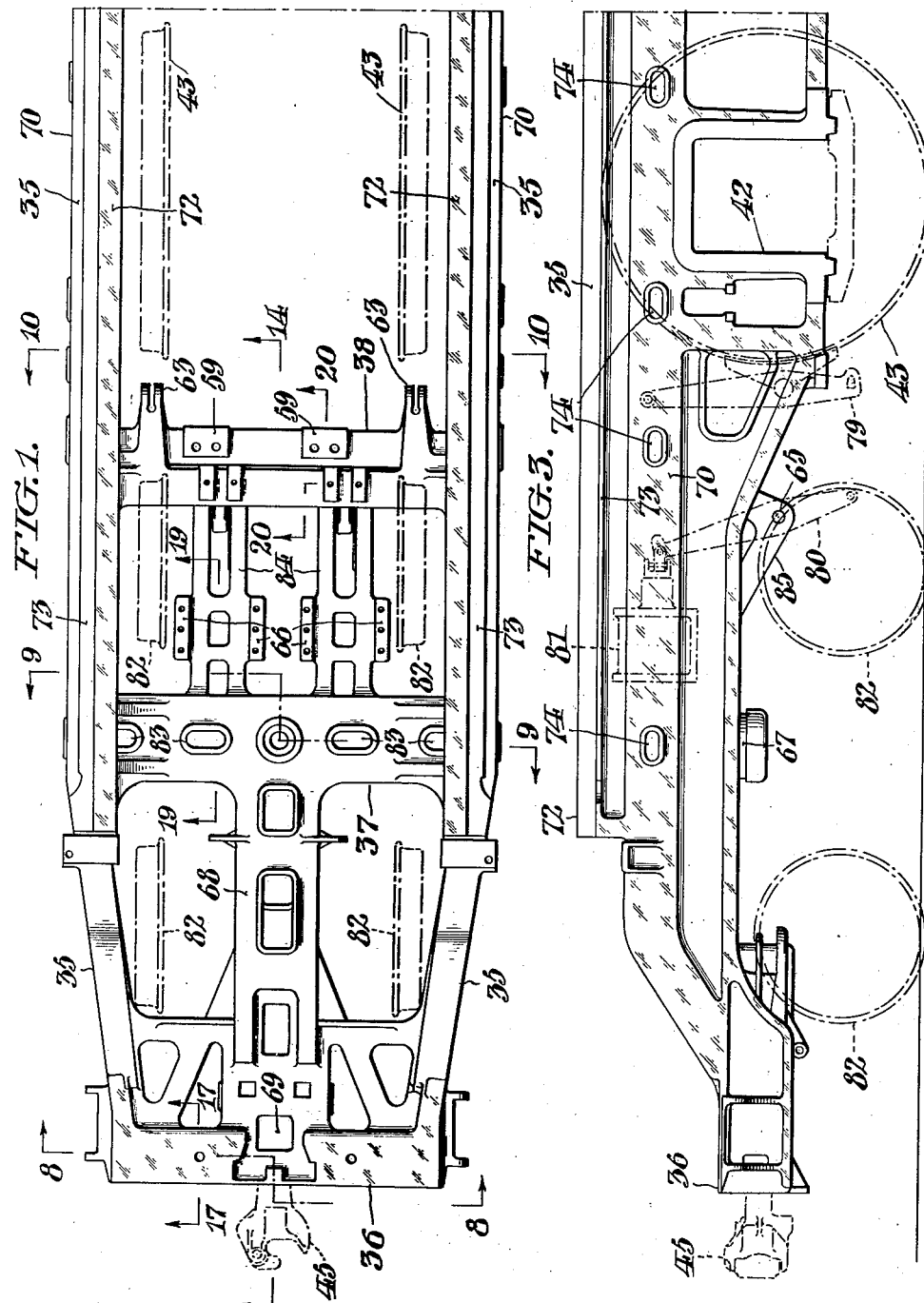

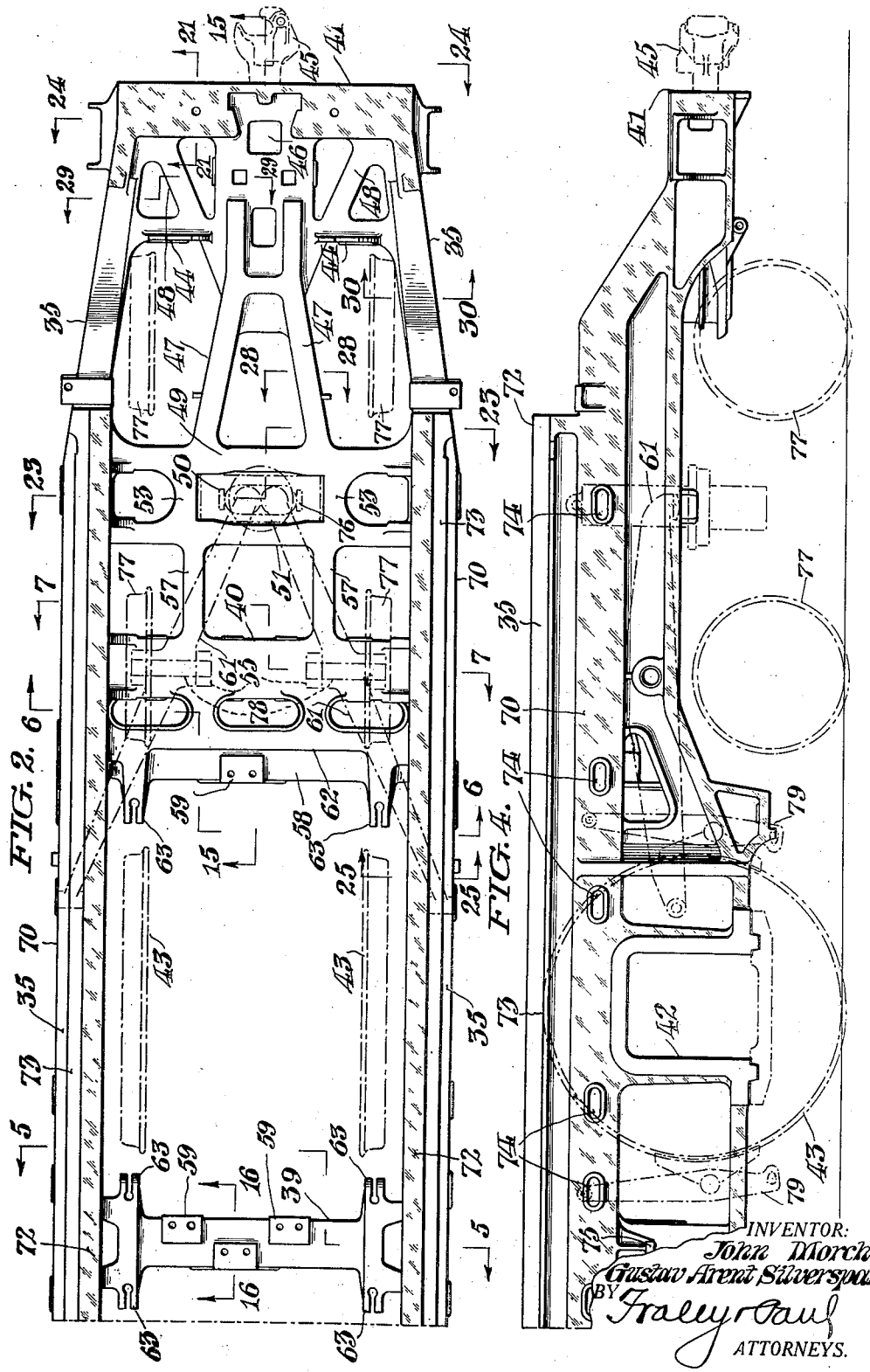

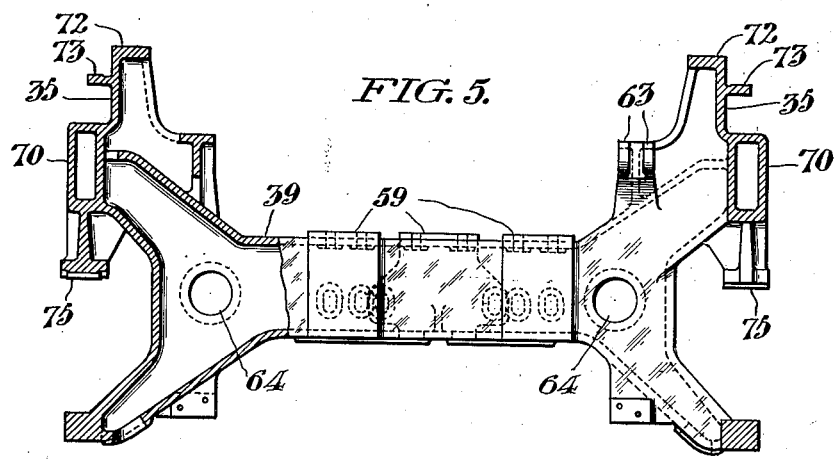
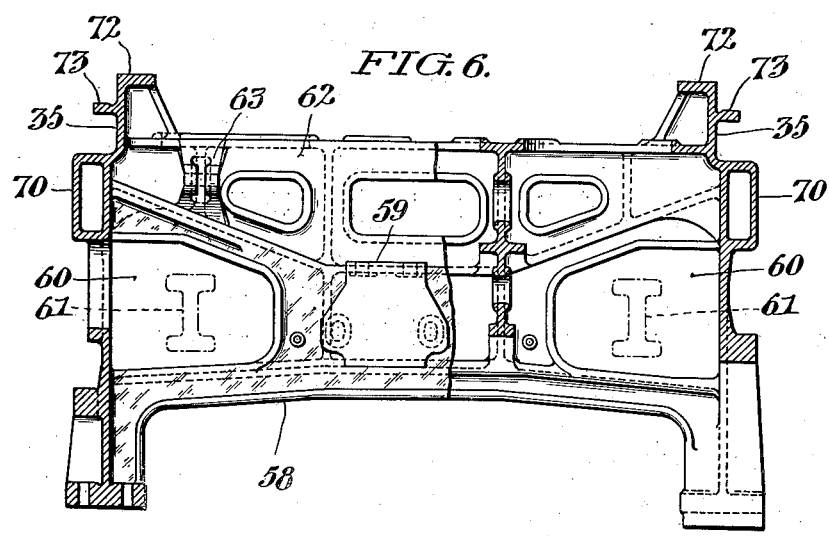
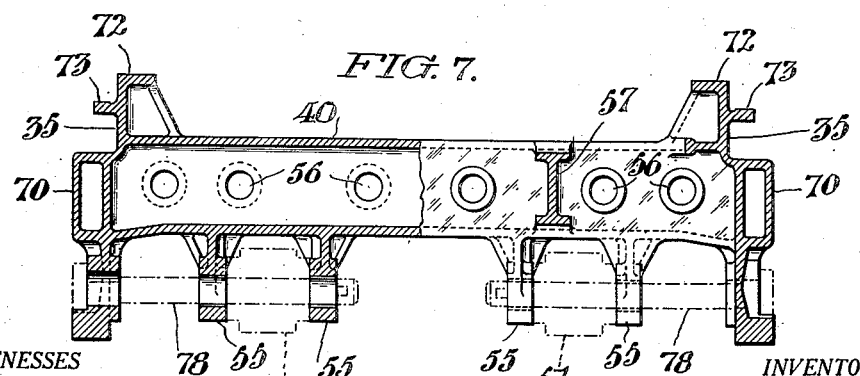

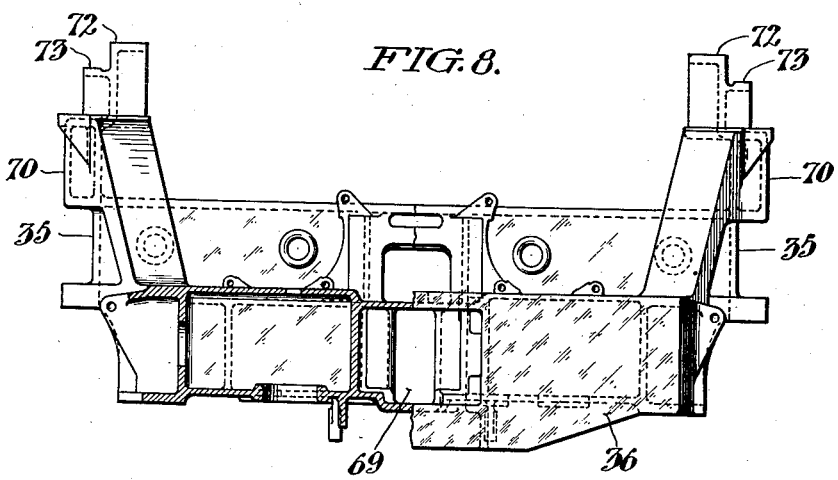
FIG. 8.
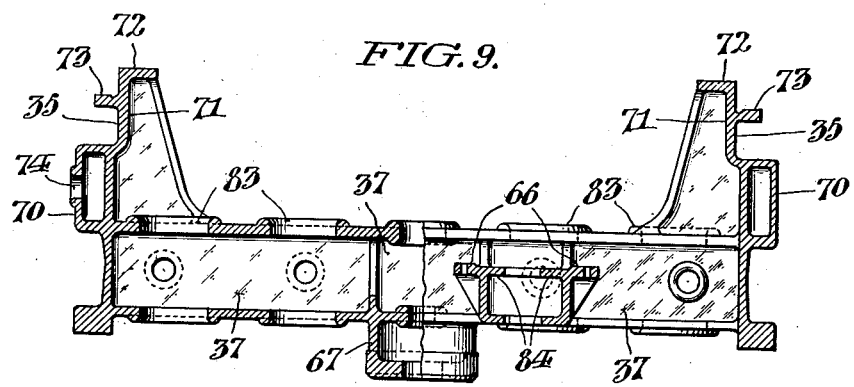
FIG. 9.
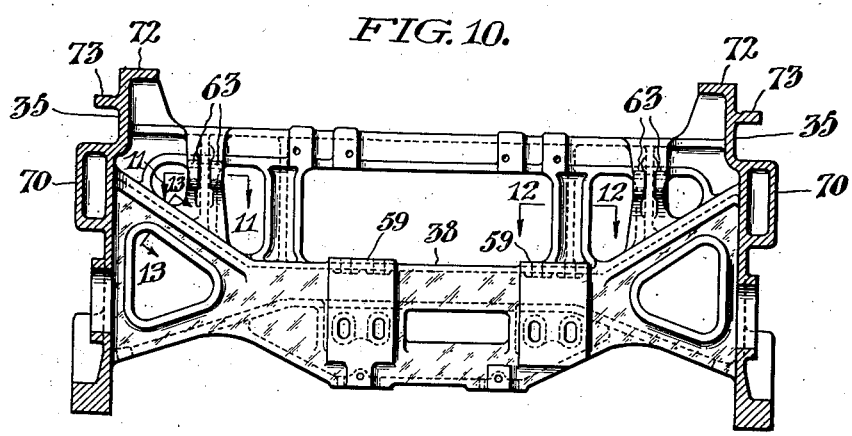
FIG. 10.
FIG. 11. FIG. 12. FIG. 13.
  

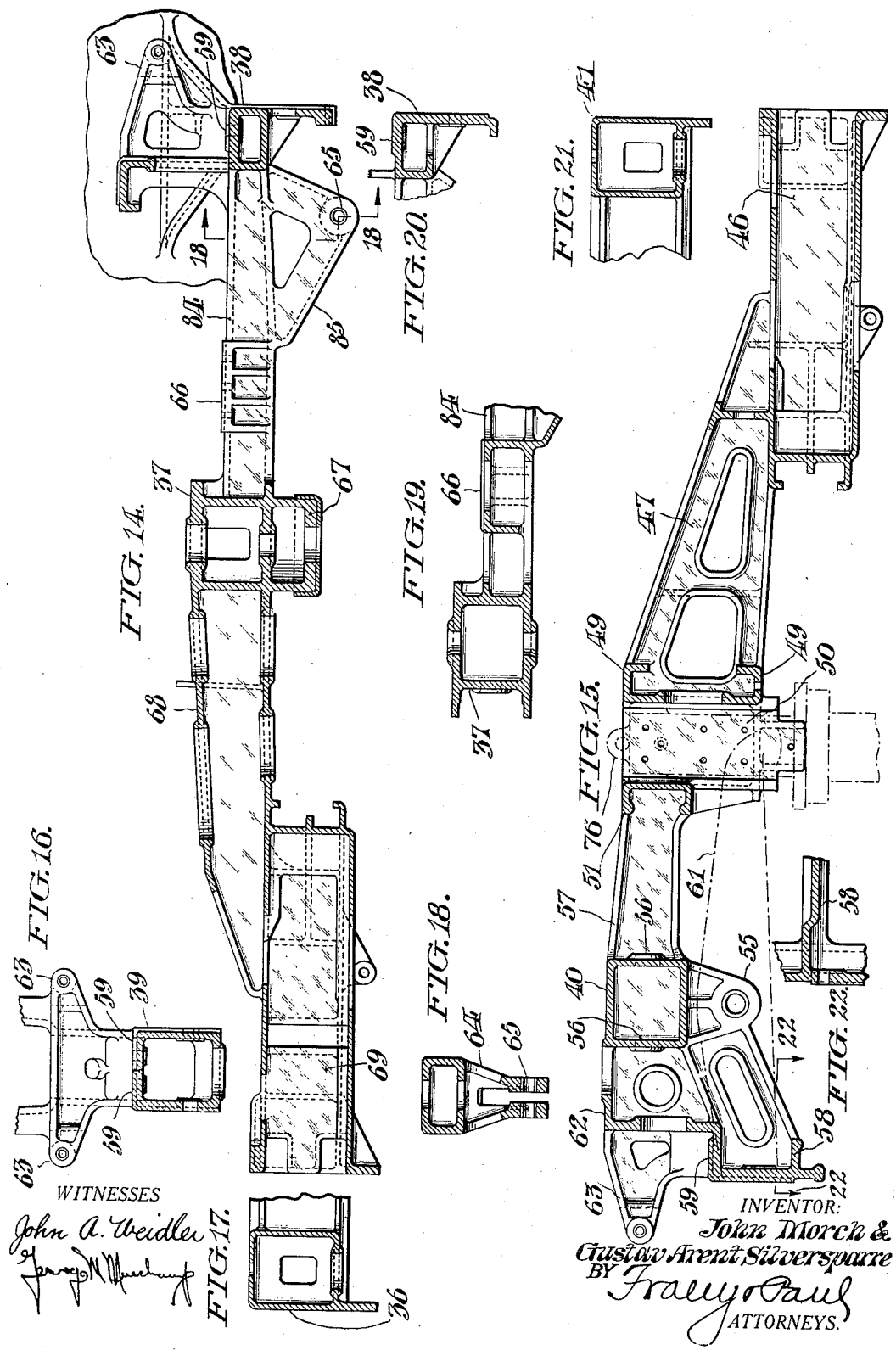

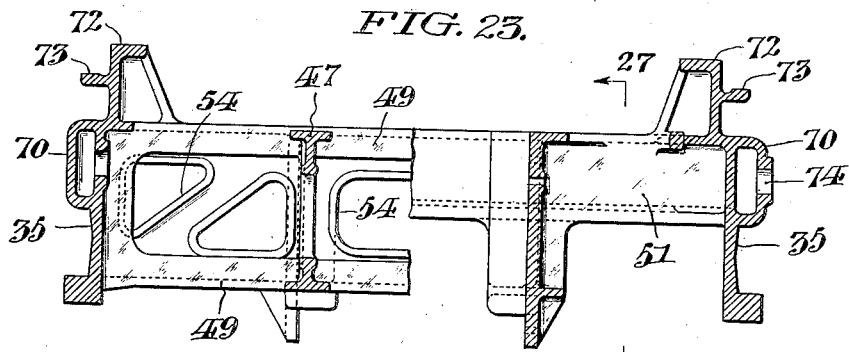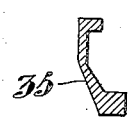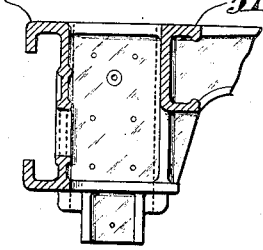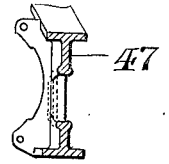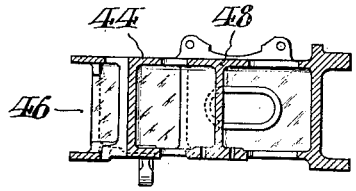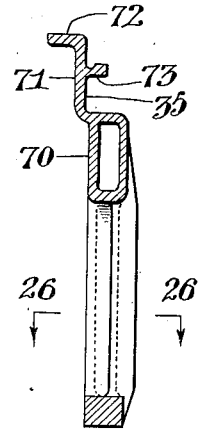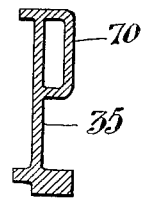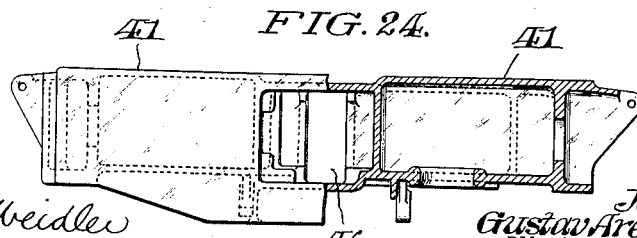

1,776,079

UNITED STATES PATENT OFFICE

JOHN MORCH, OF ALTOONA, AND GUSTAV ARENT SILVERSPARRE, OF JUNIATA, PENNSYLVANIA

FRAME FOR ELECTRIC LOCOMOTIVES

Application filed April 25, 1929. Serial No. 358,097.

Our invention relates particularly to integral or one-piece cast frames for electric locomotives, though some features of the invention may obviously be applied to other types of locomotives.

In the design of electric locomotive frames certain factors necessarily receive paramount consideration. These factors include the wheel spacing, the location of the motor and the supports therefor, the location of the spring gear which carries the frame, the location of the brake lever fulcrums and clog hanger supports, and the manner of supporting the cab structure. The principal object of our invention is to provide a one-piece or integral frame in which these factors have been given prime consideration, and which is characterized by lightness in weight in proportion to its strength and rigidity.

One specific object of the invention is to provide in an integral cast frame a new end frame construction for distributing the draft gear shocks throughout the frame.

Another specific object is to provide in such a frame means for carrying a plurality of three point motor supports whereby stresses set up in the main frame are not transferred to the motor frames.

Another specific object is to provide in such a frame novel means for supporting a spring rigging crosshead guide and spring rigging equalizer beams.

Another specific object is to provide in such a frame novel means for supporting such elements as brake lever brackets, and brake lever fulcrums.

Another specific object is to provide in such a frame improved means for accommodating the locomotive cab floor and outside deck plates.

Other objects and advantages characterizing our invention will be more apparent from the detailed description which follows and which has reference to the accompanying drawings illustrating one embodiment of the invention. Of the drawings:

Fig. 1 is a top plan view of one-half of a locomotive frame embodying the invention.

Fig. 2 is a top plan view of the other half of the locomotive frame, the views of Figs. 1 and 2 forming a complete plan view of the entire assemblage.

Fig. 3 is a side elevation of the part of the frame shown in Fig. 1.

Fig. 4 is a side elevation of the part of the frame shown in Fig. 2.

Fig. 5 is an enlarged cross-section of the frame taken on the line 5—5 of Fig. 2.

Fig. 6 is an enlarged cross-section of the same taken on the line 6—6 of Fig. 2.

Fig. 7 is an enlarged cross-section of the same taken on the line 7—7 of Fig. 2.

Fig. 8 is an enlarged end view of the same partly with a portion broken away on the line 8—8 of Fig. 1.

Fig. 9 is an enlarged cross-section of the same taken on the line 9—9 of Fig. 1.

Fig. 10 is an enlarged cross-section of the same taken on the line 10—10 of Fig. 1.

Fig. 11 is a cross-section taken on the line 11—11 of Fig. 10.

Fig. 12 is a cross-section taken on the line 12—12 of Fig. 10.

Fig. 13 is a cross-section taken on the line 13—13 of Fig. 10.

Fig. 14 is an enlarged longitudinal cross-section of one end frame taken on the line 14—14 of Fig. 1.

Fig. 15 is an enlarged longitudinal cross-section of the other end frame taken on the line 15—15 of Fig. 2.

Fig. 16 is a cross-section taken on the line 16—16 of Fig. 2.

Fig. 17 is a cross-section taken on the line 17—17 of Fig. 1.

Fig. 18 is a cross-section taken on the line 18—18 of Fig. 14.

Fig. 19 is a cross-section taken on the line 19—19 of Fig. 1.

Fig. 20 is a cross-section taken on the line 20—20 of Fig. 1.

Fig. 21 is a cross-section taken on the line 21—21 of Fig. 2.

Fig. 22 is a cross-section taken on the line 22—22 of Fig. 15.

Fig. 23 is an enlarged cross-section taken on the line 23—23 of Fig. 2.

Fig. 24 is an enlarged end view of the frame with a portion broken away on the line 24—24 of Fig. 2.

Fig. 25 is a cross-section taken on the line 25—25 of Fig. 2.

Fig. 26 is a cross-section taken on the line 26—26 of Fig. 25.

Fig. 27 is a cross-section taken on the line 27—27 of Fig. 23.

Fig. 28 is a cross-section taken on the line 28—28 of Fig. 2.

Fig. 29 is a cross-section taken on the line 29—29 of Fig. 2.

Fig. 30 is a cross-section taken on the line 30—30 of Fig. 2.

The locomotive frame as illustrated consists of an integral casting comprising generally longitudinal side members 35 of box shape and a series of cross members 36, 37, 38, 39, 40 and 41, all substantially of box shape. The longitudinal members 35 are formed with suitable pedestals 42 for the axle journal boxes of the driving wheels which are diagrammatically shown at 43.

For convenience the salient features of the frame are hereinafter described with reference initially to the end frame shown at the right hand of Fig. 2, and thereafter proceeding along the frame to the left-hand of Fig. 1.

With particular reference to Figs. 2 and 15 it will be observed that the side members 35 converge toward the end of the frame and form with the cross ties 44 and A frame carrying at its end the usual coupler 45, the drawbar of which is housed in the draft gear pocket 46. The draft gear shocks are communicated to the longitudinal side members by divergent tension and compression members 48 and 47. The members 48 positioned at each side of the draft gear pocket 46, are preferably of I-section and carry the draft gear shocks direct to the longitudinal side members 35, whereas the members 47, which are also of I-section, as shown in Fig. 28, extend back from the draft gear pocket 46 and terminate in a plurality of transverse U-shaped members 49 positioned one above the other. By virtue of this construction the stresses and strains communicated from the draft gear are distributed to the longitudinal side members 35 at different points of their length and to the spring rigging crosshead guide 50. The equalizer crosshead is diagrammatically indicated at 76, the crosshead guide being positioned between the transverse U-shaped member 51 and the parallel members 49, and there being a pair of end walls 53 forming bridges between the transverse members 51 and 49. Additional stiffening members 54, as shown in Fig. 23, serve to support the flange of the crosshead guide 50. The lower end of the equalizer crosshead 76 serves as a seat for the truck, the wheels of which are indicated at 77.

Immediately back of the crosshead guide is the box-shaped cross member 40 which, as shown, more clearly in Fig. 7, carries a plurality of pendant perforated arms 55 adapted to carry fulcrum pins 78 for the spring rigging equalizer beams indicated at 61. The cross member 40 is provided with openings 56 throughout its length which permit the venting of the cores used therein in the casting operation. Formed with the cross member 40 there are a pair of end walls 57 of I-section which bridge the gap between the member 40 and the member 51. Adjacent the cross member 40 and combined therewith there is also a transverse member 58 which carries a pad 59 serving as a motor nose clamp support. The motor suspension member 58, as best shown in Fig. 6, is provided at its ends with two large openings 60, these openings permitting the passage of spring rigging equalizer beams. It will be observed that the spring rigging equalizer beams, which are diagrammatically indicated at 61, converge from the sides 35 of the frame passing through the openings 60 and between the pendant legs 55 on the cross member 40, at which point they are fulcrumed by means of the pins 78 through the legs 55, and terminate at the crosshead guide 50.

An additional transverse frame stiffening member 62 is positioned above the motor nose suspension member 58 and is provided with a pair of bifurcated brackets 63 for supporting the clog hangers, indicated at 79, for the driver brakes. The central cross member 39, sections of which are shown in Figs. 5 and 16, also carries similar projecting brackets 63, a pair of these brackets being positioned in alignment with and facing the brackets on the cross member 62. Additional pads 59 for engaging motor nose clamps are cast integral with the frame cross member 39 which is of box-shaped construction and provided at intervals with cored openings 64, for lightening the web, the edges of the openings 64 being beaded to give added rigidity.

The cross-ties or transverse motor suspension members 58, 39 and 38, sections of which are shown in Figs. 6, 5 and 10 respectively, are in each case provided with central horizontal portions, adapted to form supports for the motors, and forked ends, the upper and lower branches of the forked ends terminating in the main longitudinal side members 35. Upon the upper branches of the forked ends are carried the brake lever brackets 63 which project horizontally into the motor openings in alignment with each other and in a plane somewhat above the motor supports.

With reference to Figs. 1 and 14 it will be observed that this end of the locomotive frame, though having many similar characteristics, is not a counterpart of the other end. The boxed shaped member 38 carries pads 59 and bifurcated brackets 63 similar to those described. Suspended beneath this member are perforated webs 85 having openings 65 for the fulcrums of brake levers 80. The brake cylinders 81 are positioned on parallel supports 84 which are tied integral with the cross members 37 and 38 and which are provided with flanges 66 for accommodating the brake cylinders. A center plate 67 for the truck, the wheels of which are represented at 82, is cast integral with the cross member 37, as shown in Figs. 3, 9 and 14. The member 37 is substantially box-shaped and provided with cored openings 83 similar to those described.

At this end of the locomotive the end frame is substantially similar to the one hereinbefore described with the exception that in place of the diverging members 47 a longitudinal member 68 extends back from the draft gear pocket 69 to the cross member 37.

While the shape of the longitudinal side members 35 varies throughout the length of the frame, it will be apparent from Figs. 5, 6, 7, 9, 10, 23 and 25 that between the end frames the sides 35 are formed with a continuous box-section 70 on the top of which is provided a Z-shaped member 71, of which one leg 72 is adapted to carry the deck plate and the other leg 73 adapted to carry the cab floor sheets. The side members 35 are also perforated throughout their length with openings 74.

Projecting downward from the center of the frame are brackets 75 for centrally supporting the frame upon its spring rigging. Many other structural features of the locomotive frame are apparent from the detailed sections shown in the drawings which amply illustrate the characteristics of the various stiffening and reinforcing members which have not been described. All of the various appendages to the locomotive frame which are shown in the accompanying drawings are cast integral with the body of the frame, save those parts which have been diagrammatically indicated in broken lines, so that the operation of assembling the complete locomotive upon the frame is greatly simplified and the number of fastening means, such as bolts, rivets and the like normally employed in assembling, is considerably reduced.

The frame possesses many structural advantages both with respect to the distribution of stresses and strains and with respect to strength and rigidity in proportion to the amount of metal used. The provision, as described, of three point supports for the main motors prevents stresses set up in the main frame from being communicated to the motor frames and facilitates very considerably the assembling of the motors in the frame.

Numerous joints and connections normally made as separate parts and requiring drilling of the frame and the use of fastening bolts have been eliminated in the locomotive embodying the improved casting of this invention. Furthermore, by the provision of such appendages as clog hanger brackets, brake lever fulcrums, and fulcrums for spring rigging equalizer beams cast integral with transverse stiffening members, the longitudinal side members which form the main members of the frame have been left intact so that their strength and rigidity has not been diminished.

While one specific embodiment of the invention has been described in some detail, it will be apparent to those skilled in the art that various modifications and changes may be made in the form of the frame as described without departing from the spirit of the appended claims. It will also be apparent that certain features of the invention may be used to advantage without a corresponding use of other features.

Having thus described our invention, we claim:—

1. An integral cast end frame for a locomotive comprising side members extending substantially longitudinally of the frame, transverse members connecting said side members, a draft gear housing within said longitudinal and transverse members, and tension members diverging forward and compression members diverging backward from said draft gear housing for communicating the draft gear shocks to the side members aforesaid.

2. An integral cast locomotive frame including longitudinal side members, transverse stiffening members forming a spring rigging crosshead guide, a draft gear housing, and divergent members extending back from said draft gear housing to said transverse stiffening members.

3. An integral cast locomotive frame including longitudinal side members, a plurality of transverse U-shaped members for supporting a spring rigging crosshead guide, a draft gear housing, and divergent I-section members extending back from said draft gear housing to said transverse U-shaped members.

4. An integral cast locomotive frame including longitudinal side members, parallel transverse members adapted to accommodate therebetween a spring rigging crosshead guide, walls forming bridges between said transverse members, and additional stiffening members supporting a flange of the crosshead guide.

5. An integral cast locomotive frame including a box-shaped cross member having cored openings therein to permit the escape of foundry gas when the frame is being poured, and a plurality of perforated arms on said cross member, said arms being adapted to carry fulcrum pins for spring rigging equalizer beams.

6. An integral cast electric locomotive frame including longitudinal side members, a transverse member connecting said longitudinal members, said transverse member having a pad adapted to engage a motor nose clamp and having openings therein to permit the passage of spring rigging equalizer beams.

7. An integral cast locomotive frame including longitudinal side members, transverse stiffening members and longitudinal brake cylinder supports between said stiffening members, said supports having pendant webs adapted to accommodate brake lever fulcrums.

8. A locomotive frame including longitudinal side members, each member comprising a lower box-shaped portion and an upper Z-shaped portion cast integral with said box-shaped portion, said Z-shaped portion having one leg adapted to carry a deck plate and the other leg adapted to carry the cab floor.

9. An integral cast locomotive frame including longitudinal side members, a crosstie having a central horizontal portion adapted to form a motor support and having forked ends comprising upper and lower branches terminating in said longitudinal side members, the upper branches of said forked ends carrying brake lever brackets.

10. An integral cast locomotive frame including longitudinal side members, transverse members connecting said side members and forming therewith a plurality of openings in which motors are adapted to be suspended, said transverse members having central horizontal portions forming motor supports and having forked ends comprising upper and lower branches terminating in said longitudinal side members, the upper branches of said forked ends carrying brake lever brackets projecting into the motor openings in a plane above the motor supports.

In testimony whereof, we have hereunto signed our names at Altoona, Pennsylvania, this 22nd day of April, 1929.

JOHN MORCH.
GUSTAV ARENT SILVERSPARRE.